(12) United States Patent
Tomescu (10) Patent No.: US 11,536,740 B2
(45) Date of Patent: Dec. 27, 2022

(54) PITCH CONTROL ASSEMBLY FOR AN AIRCRAFT-BLADED ROTOR

(71) Applicant: PRATT & WHITNEY CANADA CORP., Longueuil (CA)

(72) Inventor: Dana Tomescu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 480 days.

(21) Appl. No.: 16/681,756

(22) Filed: Nov. 12, 2019

(65) Prior Publication Data

US 2021/0071589 A1    Mar. 11, 2021

Related U.S. Application Data

(60) Provisional application No. 62/896,163, filed on Sep. 5, 2019, provisional application No. 62/896,157, filed on Sep. 5, 2019.

(51) Int. Cl.
*G01P 3/488*    (2006.01)
*B64C 11/30*    (2006.01)
(Continued)

(52) U.S. Cl.
CPC .......... *G01P 3/488* (2013.01); *B64C 11/301* (2013.01); *B64C 27/473* (2013.01); *B64C 27/57* (2013.01); *B64D 27/10* (2013.01); *F01D 7/00* (2013.01); *F01D 17/02* (2013.01); *F01D 17/06* (2013.01); *F01D 17/20* (2013.01); *F01D 21/003* (2013.01);
(Continued)

(58) Field of Classification Search
CPC ...... G01P 3/487; G01D 5/145; G01D 5/2013; B64C 11/06; B64C 11/301; F01D 7/00; F01D 17/06; F01D 17/20; F01D 21/003; B63H 2003/006; F02C 7/32; F05D 2270/80; F05D 2260/70; F05D 2220/323
See application file for complete search history.

(56) References Cited

U.S. PATENT DOCUMENTS 5,668,471 A    8/1997 Lequesne et al.
5,714,883 A    2/1998 Schroeder et al.
(Continued)

FOREIGN PATENT DOCUMENTS

EP    0353076 A2 *  1/1990  ............ G01D 5/247

*Primary Examiner* — Woody A Lee, Jr.
*Assistant Examiner* — Jesse M Prager
(74) *Attorney, Agent, or Firm* — Norton Rose Fulbright Canada LLP (57) ABSTRACT

A feedback device for use in a gas turbine engine, and methods and systems for controlling a pitch for an aircraft-bladed rotor, are provided. The feedback device is composed of a circular disk and a plurality of position markers. The circular disk is coupled to rotate with a rotor of the gas turbine engine, to move along a longitudinal axis of the rotor, and has first and second opposing faces defining a root surface that extends between and circumscribes the first and second faces. The plurality of position markers extend radially from the root surface, are circumferentially spaced around the circular disk, and extending along the longitudinal axis from a first end portion to a second end portion. At least part of the first end portion and/or of the second end portion comprises a material having higher magnetic permeability than that of a remainder of the position markers.

19 Claims, 7 Drawing Sheets

(51) Int. Cl.

| | |
|---|---|
| *B64D 27/10* | (2006.01) |
| *F01D 7/00* | (2006.01) |
| *F01D 17/20* | (2006.01) |
| *F01D 21/00* | (2006.01) |
| *F01D 17/06* | (2006.01) |
| *G01D 5/14* | (2006.01) |
| *F01D 17/02* | (2006.01) |
| *F04D 29/36* | (2006.01) |
| *B64C 27/473* | (2006.01) |
| *B64C 27/57* | (2006.01) |
| *F02C 9/22* | (2006.01) |
| *F02D 29/02* | (2006.01) |
| *G01D 5/12* | (2006.01) |
| *G01D 5/20* | (2006.01) |
| *G01P 3/487* | (2006.01) |
| *F02C 7/32* | (2006.01) |
| *B63H 3/00* | (2006.01) |
| *B64C 11/06* | (2006.01) |
| *F02D 41/28* | (2006.01) |

(52) U.S. Cl.
CPC ............... *F02C 9/22* (2013.01); *F02D 29/02* (2013.01); *F04D 29/362* (2013.01); *G01D 5/125* (2013.01); *G01D 5/145* (2013.01); *G01D 5/2013* (2013.01); *G01P 3/487* (2013.01); *B63H 2003/006* (2013.01); *B64C 11/06* (2013.01); *B64C 2027/4733* (2013.01); *F02C 7/32* (2013.01); *F02D 2041/281* (2013.01); *F02D 2041/288* (2013.01); *F05B 2270/328* (2013.01); *F05D 2220/323* (2013.01); *F05D 2260/70* (2013.01); *F05D 2270/02* (2013.01); *F05D 2270/80* (2013.01); *F05D 2270/821* (2013.01); *F05D 2300/507* (2013.01)

(56) References Cited

U.S. PATENT DOCUMENTS

| | | | |
|---|---|---|---|
| 5,731,702 A | 3/1998 | Schroeder et al. | |
| 9,360,494 B2* | 6/2016 | Odaka | G01P 3/488 |
| 2004/0224816 A1* | 11/2004 | Lang | F02D 41/009 |
| | | | 477/3 |
| 2011/0121823 A1* | 5/2011 | Bradley | G01D 5/145 |
| | | | 324/207.2 |
| 2013/0038319 A1* | 2/2013 | Gayney | G01P 3/488 |
| | | | 324/166 |
| 2018/0050816 A1* | 2/2018 | Yakobov | B64D 35/02 |
| 2018/0320601 A1* | 11/2018 | Snyder | F02C 7/232 |
| 2021/0033685 A1* | 2/2021 | Marauska | G01R 33/096 |

* cited by examiner

PITCH CONTROL ASSEMBLY FOR AN AIRCRAFT-BLADED ROTOR

CROSS-REFERENCE TO RELATED APPLICATIONS

This patent application claims the benefit of U.S. Provisional Patent Application 62/896,157, filed Sep. 5, 2019, and of U.S. Provisional Patent Application 62/896,163, filed Sep. 5, 2019.

TECHNICAL FIELD

The present disclosure relates generally to aircraft engines, and more specifically to pitch control systems for aircraft engines.

BACKGROUND OF THE ART

On featherable aircraft propeller systems, it is desirable to accurately measure the propeller blade pitch (or beta) angle to ensure that the blade angle is controlled according to the engine power set-point requested, such as in reverse and low pitch situations, also known as the beta operating region. For this purpose, some propeller feedback systems use a beta or feedback device, sometimes referred to as a phonic wheel, which rotates with the engine.

The feedback device has multiple readable markers disposed on an outer surface thereof, and a sensor can be used to measure the rotation of the feedback device via the markers, providing a proxy value for the rotational speed of the engine, as well as measure blade angle. Existing feedback devices are however vulnerable to a so-called "edge-effect" that leads to an increase in reading error as the sensor approaches the edges of the feedback device.

Therefore, improvements are needed.

SUMMARY

In accordance with a broad aspect, there is provided a feedback device for use in a gas turbine engine. The feedback device comprises a circular disk and a plurality of position markers. The circular disk is coupled to rotate with a rotor of the gas turbine engine and to move along a longitudinal axis of the rotor, the circular disk having first and second opposing faces and defining a root surface that extends between and circumscribes the first and second faces. The plurality of position markers extend radially from the root surface, are circumferentially spaced around the circular disk, and extend along the longitudinal axis from a first end portion to a second end portion, wherein at least part of the first end portion and/or of the second end portion comprises a material having higher magnetic permeability than that of a remainder of the position markers.

In accordance with another broad aspect, there is provided a method for controlling a pitch for an aircraft-bladed rotor, comprising: obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers extending radially from a root surface of a circular disk composing the feedback device, the root surface extending between and circumscribing first and second opposing faces of the circular disk, and spaced circumferentially around the feedback device defining first and second axially-separated end portions, wherein at least part of the first end portion and/or of the second end portion comprises a material having higher permeability than a remainder of the position markers; processing the plurality of sensor signals to identify passage of the plurality of position markers of the feedback device; and generating, based on the processed sensor signals, a feedback signal indicative of the blade pitch angle.

In accordance with a further broad aspect, there is provided a system for controlling a pitch for an aircraft-bladed rotor. The system comprises a processing unit, and a non-transitory computer-readable memory communicatively coupled to the processing unit. The non-transitory computer-readable medium comprises computer-readable program instructions executable by the processing unit for: obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers extending radially from a root surface of a circular disk composing the feedback device, the root surface extending between and circumscribing first and second opposing faces of the circular disk, and spaced circumferentially around the feedback device defining first and second axially-separated end portions, wherein at least part of the first end portion and/or of the second end portion comprises a material having higher permeability than a remainder of the position markers; processing the plurality of sensor signals to identify passage of the plurality of position markers of the feedback device; and generating, based on the processed sensor signals, a feedback signal indicative of the blade pitch angle.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
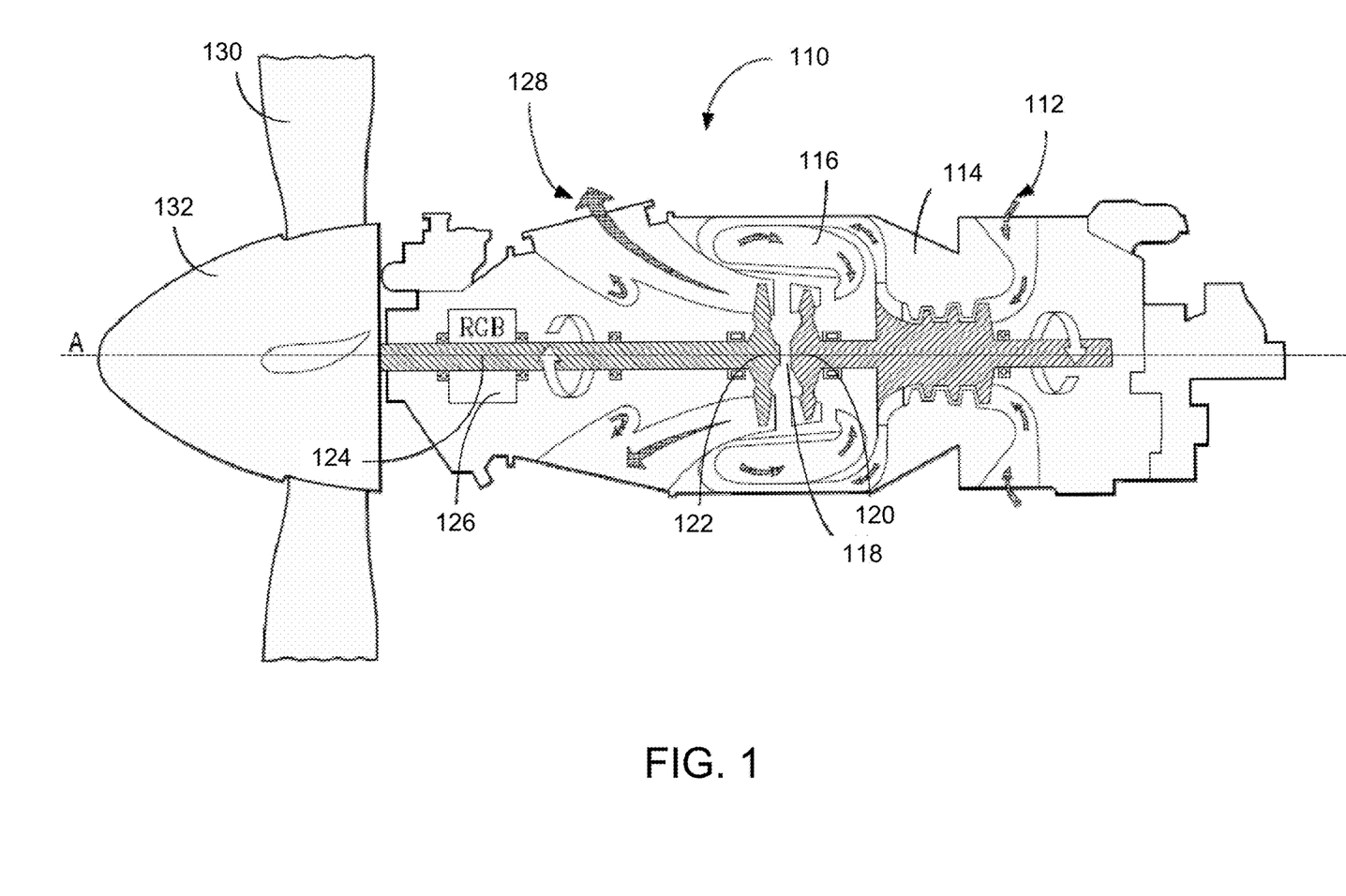
FIG. 1 is a schematic cross-sectional view of an example gas turbine engine.

FIG. 1 depicts a gas turbine engine 110 of a type typically provided for use in subsonic flight. The engine 110 comprises an inlet 112 through which ambient air is propelled, a compressor section 114 for pressurizing the air, a combustor 116 in which the compressed air is mixed with fuel and ignited for generating an annular stream of hot combustion gases, and a turbine section 118 for extracting energy from the combustion gases.

The turbine section 118 comprises a compressor turbine 120, which drives the compressor assembly and accessories, and at least one power or free turbine 122, which is independent from the compressor turbine 120 and rotatingly drives a rotor shaft (also referred to herein as a propeller shaft or an output shaft) 124 about a propeller shaft axis 'A' through a reduction gearbox (RGB) 126. Rotation of the output shaft 124 is facilitated by one or more bearing assemblies, which can be disposed within the RGB 126 or at any other suitable location. Hot gases may then be evacuated through exhaust stubs 128. The gas generator of the engine 110 comprises the compressor section 114, the combustor 116, and the turbine section 118.

A rotor, in the form of a propeller 130 through which ambient air is propelled, is hosted in a propeller hub 132. The rotor may, for example, comprise the propeller 130 of a fixed-wing aircraft, or a main (or tail) rotor of a rotary-wing aircraft such as a helicopter. The propeller 130 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
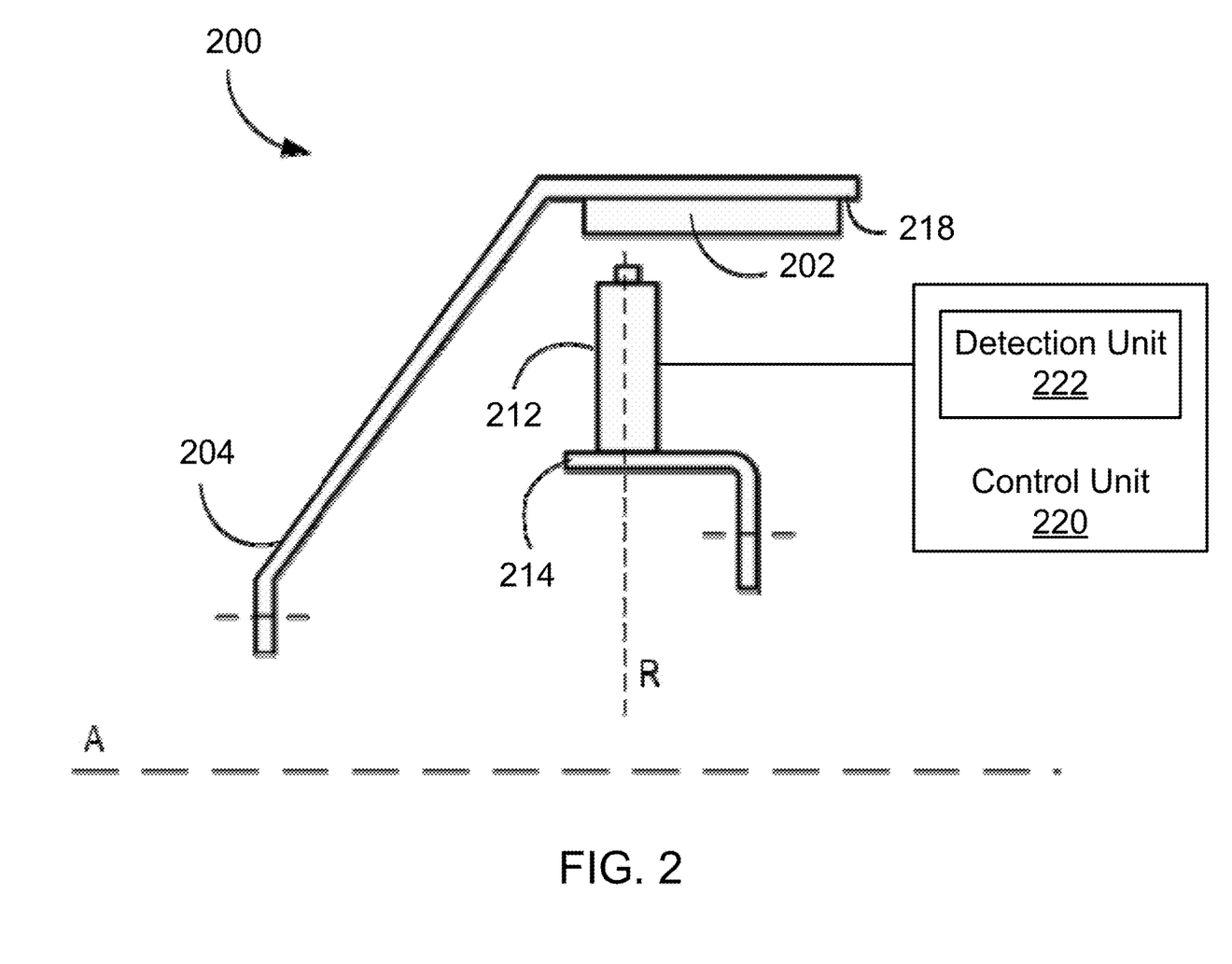
FIG. 2 is a schematic diagram of an example feedback sensing system.

With reference to FIG. 2, a feedback sensing system 200 for pitch-adjustable blades of bladed rotors of aircraft will now be described. The system 200 may be used for sensing a feedback device (also referred to as a feedback ring or phonic wheel) 204 of an aircraft propeller. It should however be understood that, although the system 200 is described and illustrated herein with reference to an aircraft propeller, such as the propeller 130 of FIG. 1, the system 200 may apply to other types of rotors, such as those of helicopters. The systems and methods described herein are therefore not limited to being used for aircraft propellers.

In some embodiments, the system 200 provides for detection and measurement of rotational speed of one or more rotating elements of the engine 110 and of propeller blade angle on propeller systems, such as the propeller 130 of FIG. 1. The system 200 may interface to existing mechanical interfaces of typical propeller systems to provide a digital detection for electronic determination of the propeller blade angle. It should be noted that although the present disclosure focuses on the use of the system 200 and the feedback device 204 in gas-turbine engines, similar techniques can be applied to other types of engines, including, but not limited to, electric engines and hybrid electric propulsion systems having a propeller driven in a hybrid architecture (series, parallel, or series/parallel) or turboelectric architecture (turboelectric or partial turboelectric).

The system 200 comprises an annular member 204 and one or more sensors 212 positioned proximate the annular member 204. Annular member 204 (referred to herein as a feedback device) has a plurality of circumferentially-spaced apart and detectable features (also referred to as position markers or teeth) 202 disposed thereon for detection by sensor(s) 212. In some embodiments, the position markers 202 and sensor(s) 212 may be disposed on a radially-outer side of feedback device 204. Alternatively, position markers 202 and sensor(s) 212 could be disposed on a radially-inner side of feedback device 204. Several position markers 202 may be spaced about the circumference (i.e., the perimeter) of the feedback device 204. The position markers 202 can be spaced equiangularly, at varying intervals, or the like. In addition, the feedback device 204 can include any suitable number of position markers 202, which can vary based on the dimensions of the feedback device 204. Other embodiments may apply.

In one embodiment, the one or more sensors 212 are fixedly mounted to a static portion of the engine 110. In other embodiments, the one or more sensors 212 are mounted for rotation with propeller 130 and to move axially with adjustment of the blade angle of the blades of the propeller 130, and the feedback device 204 is fixedly mounted to a static portion of the engine 110.

In some embodiments, the feedback device 204 is mounted for rotation with propeller 130 and to move axially along rotation axis 'A' to a plurality of axial positions, with adjustment of the blade angle of the blades of the propeller 130. An axial position of the feedback device 204 may then correspond to a respective angular (pitch) position of the blades and the position markers 202 may be useful for detecting the axial position of the feedback device 204 as the feedback device 204 and bladed rotor 130 rotate. The feedback device 204 may therefore be useful for detecting the angular position of the adjustable blades by way of correlation.

The system 200 also includes a control unit 220 communicatively coupled to the one or more sensors 212. The sensor(s) 212 are configured for producing one or more sensor signals which are transmitted to or otherwise received by the control unit 220, for example via a detection unit 222 thereof. The sensor signal can be an electrical signal, digital or analog, or any other suitable type of signal. In some embodiments, the sensor(s) 212 produce a signal pulse in response to detecting the presence of a position marker 202 in a sensing zone of the sensor 212. For example, the sensor 212 is an inductive sensor that operates on detecting changes in magnetic flux, and has a sensing zone which encompasses a circular or rectangular area or volume in front of the sensor 212. When a position marker 202 is present in the sensing zone, or passes through the zone during rotation of the feedback device 204, the magnetic flux generated by the sensor(s) 212 in the sensing zone is varied by the presence of the position marker 202, and the sensor 212 can produce a signal pulse, which forms part of the sensor signal. Accordingly, the position markers 202 may be made of any suitable material (e.g., a ferromagnetic material or the like) which would cause the passage of the position markers 202 near the sensor 212 to provide a change in magnetic permeability within the magnetic field generated by the sensor 212.

In the example illustrated in FIG. 2, a side view of a portion of feedback device 204 and sensor 212 in accordance with at least some embodiments is shown. The sensor 212 is mounted to a flange 214 of a housing of the reduction gearbox 126, so as to be positioned adjacent the plurality of position markers 202, which extend away from the feedback device 204 and towards the sensor 212. The sensor 212 may be mounted at any suitable angle relative to the position markers 202. In some embodiments, the sensor 212 is secured to the propeller 130 so as to extend away from the flange 214 and towards the position markers 202 along a radial direction, identified in FIG. 2 as direction 'R'. Sensor 212 and flange 214 may be fixedly mounted, for example to the housing of the reduction gearbox 126, or to any other static element of the engine 110, as appropriate.

In some embodiments, a single sensor 212 is mounted in close proximity to the feedback device 204 and the position markers 202. In some other embodiments, in order to provide redundancy as well as multiple signal sources at different axial locations, one or more additional sensors, which may be similar to the sensor 212, are provided. In particular, it may be desirable to use multiple sensors when the axial distance (i.e. the distance along axis 'A') travelled by the feedback device 204 is too large for the range of the sensors as in 212. It should be understood that any suitable number of sensors may apply and the number of sensors 212 and their positions may be optimized according to the specifics of the application.

Figure 3:
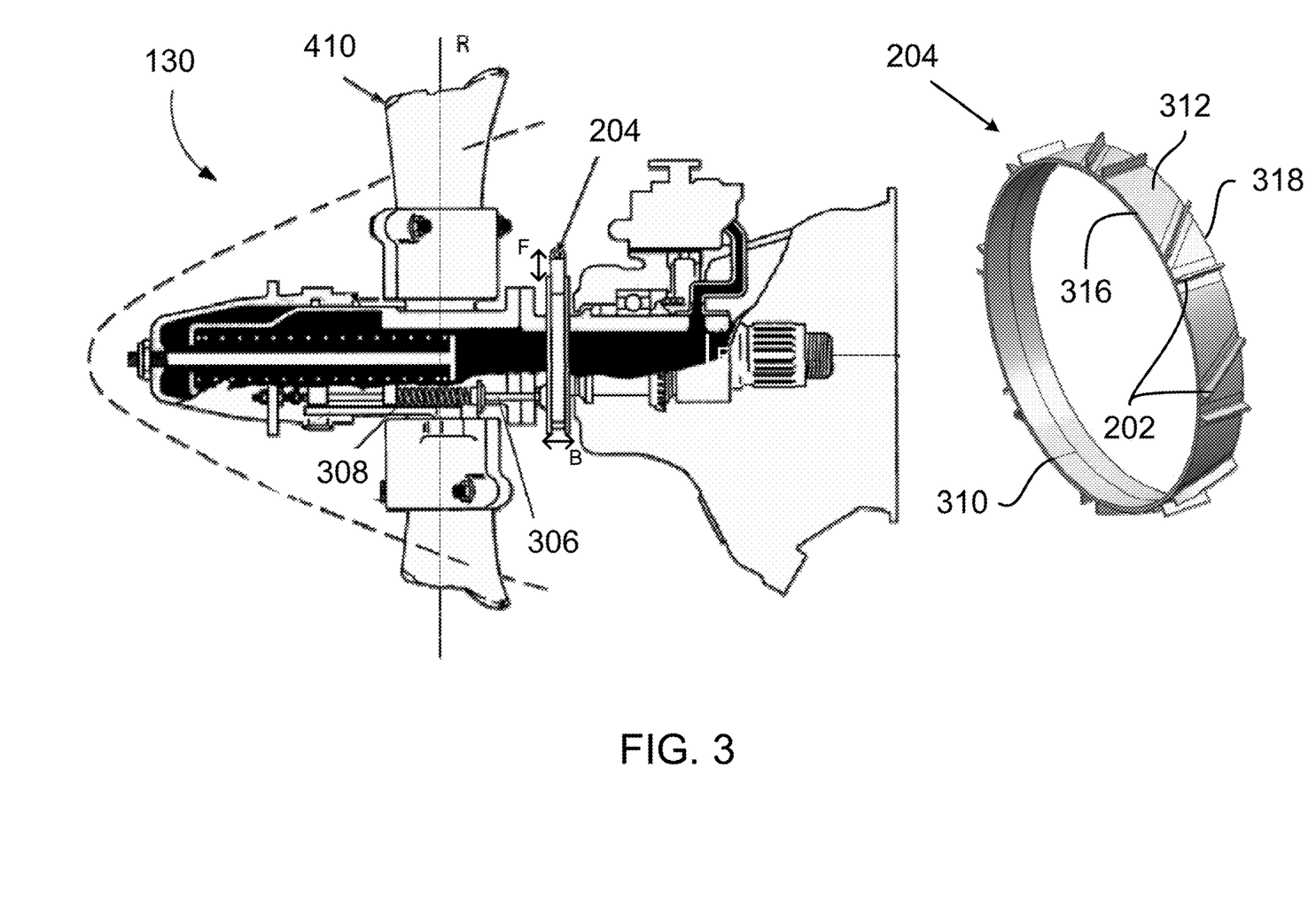
FIG. 3 is a schematic diagram of the propeller of FIG. 1 with the pitch control system of FIG. 2, in accordance with at least one embodiment.

With additional reference to FIG. 3, the feedback device 204 is a circular disk or ring-like element which rotates as part of the engine 110, for example with the propeller shaft 124 or with the propeller 130. For example, the feedback device 204 can be composed of ring element 310. The ring element 310 comprises opposing faces having the edge surfaces 316, 318 and defines an outer surface 312 (sometimes referred to as a "root surface") which extends between the opposing faces and circumscribes them. Put differently, the root surface 312 of the feedback device 204 is the outer periphery of the ring element 310 which spans between the two opposing edge surfaces 316, 318 and the root surface 312 intersects the faces at the edge surfaces 316, 318. In these embodiments, the position markers 202 can take the form of projections which extend from the root surface 312.

The position markers 202 consist of a plurality of projections arranged along a direction substantially transverse to the edge surfaces 316, 318. In some embodiments, the position markers 202 are substantially equally spaced from one another on the root surface 312; alternatively, the spacing between the position markers 202 can vary. In some embodiments, the position markers 202 are integrally formed with the feedback device 204 so that the feedback device 204 may have a unitary construction. In some other embodiments, the position markers 202 are manufactured separately from the feedback device 204 and attached thereto using any suitable technique, such as welding or the like. In some embodiments, some of the position markers 202 have different circumferential thicknesses and/or chamfered edges. In some other embodiments, the longitudinal length of the position markers 202 varies from one to the next. Other embodiments are also considered. For example, in some embodiments, some of the position markers 202 are angled with respect to the edge surfaces 316, 318.

It should also be noted that, although the present disclosure discusses embodiments in which the position markers 202 are projections, other embodiments are also considered. The position markers 202 may, for example, comprise one or more of protrusions, teeth, walls, voids, recesses, and/or other singularities. For instance, in some embodiments, the position markers 202 may be embedded in the ring element 310 portion of the feedback device 204, such that the feedback device 204 has a substantially smooth or uniform root surface 312. A position marker 202 can then be a portion of the feedback device 204 which is made of a different material, or to which is applied a layer of a different material. The position markers 202 may then be applied to the root surface 312, for instance as strips of metal or other material for detection by the sensor 212, which can be an inductive sensor capable of sensing changes in magnetic flux (as discussed above) or any other suitable sensor such as a Hall sensor or a variable reluctance sensor. Still other embodiments are considered.

The signal pulses produced by the sensor 212, which form part of the electrical signal received by the control unit 220, can be used to determine various operating parameters of the engine 110 and the propeller 130. The position markers 202 can be used to determine a longitudinal position of the feedback device 204, and thereby assess the pitch angle for the propeller 130. In addition, detection of the position markers 202 can be used to determine a rotational speed of the feedback device 204, and thereby assess a rotational speed for the propeller 130.

Assessment of the longitudinal position of the feedback device 204 can be performed in various fashions. The longitudinal position of the feedback device 204 can be used as a proxy for the propeller blade pitch angle, as noted hereinabove. As the longitudinal position of the feedback device 204 changes, the sensor 212 will produce different signals. In this fashion, the signal produced by the sensor 212 can be used to determine the longitudinal position of the feedback device 204.

Assessment of the rotational speed of the feedback device 204 can be performed in various fashions. In some embodiments, a known number of the position markers 202 are of a different geometry than the remainder of the position markers 202, as illustrated in FIG. 3. The sensor 212 can detect the position markers 202 with different geometry, and based thereon can determine the rotational speed of the feedback device 204. In some other embodiments, a discontinuity is formed in the position markers 202 of the feedback device 204, for instance in the form of one or more "missing teeth". When a missing tooth passes by the sensor 212, no change in the sensor signal is produced. In this fashion, a longer-than-expected period in which no change in the sensor signal is detected can indicate the passage of the missing tooth. Repeated detections of the missing tooth can be used to assess the rotational speed of the feedback device 204. Other approaches are also considered.

With continued reference to FIG. 3, the feedback device 204 is supported for rotation with the propeller 130, which rotates about the longitudinal axis 'A'. The feedback device 204 is also supported for longitudinal sliding movement along the axis 'A', e.g. by support members, such as a series of circumferentially spaced feedback rods 306 that extend along the axis 'A'. A compression spring 308 surrounds an end portion of each rod 306.

As depicted in FIG. 3, the propeller 130 comprises a plurality of angularly arranged blades 410, each of which is rotatable about a radially-extending axis 'R' through a plurality of adjustable blade angles, the blade angle being the angle between the chord line (i.e. a line drawn between the leading and trailing edges of the blade) of the propeller blade section and a plane perpendicular to the axis of propeller rotation. In some embodiments, the propeller 130 is a reversing propeller, capable of operating in a variety of modes of operation, including feather, full reverse, and forward thrust. Depending on the mode of operation, the blade angle may be positive or negative: the feather and forward thrust modes are associated with positive blade angles, and the full (or maximum) reverse mode is associated with negative blade angles.

With continued reference to FIGS. 2 and 3, as the feedback device 204 rotates, varying portions thereof enter, pass through, and then exit the sensing zone of the one or more sensors 212. From the perspective of the sensor(s) 212, the feedback device 204 moves axially along axis 'A' (in the direction of arrow 'B' in FIG. 3) and rotates about direction 'F' (shown in FIG. 3). With axial travel of the feedback device 204, the one or more sensors 212 are therefore positioned adjacent to different portions of the feedback device 204. In particular, a given sensor 212 is adjacent the edge surface 318 (also referred to as the 'engine side') when the propeller is in a primary blade angle position. When the propeller 130 is in the maximum reverse condition, the sensor 212 is adjacent the edge surface 316 (also referred to as the 'propeller side'). The longitudinal (or beta) position (along axis 'A') of the feedback device 204 relative to the sensor 212 therefore varies with movement of the feedback ring 204. Other embodiments are also considered.

When the sensor 212 is positioned adjacent to the edge surfaces 316, 318 with movement of the feedback ring 204, a drop in magnetic flux detected by the sensor 212 occurs. This results in a so-called "edge-effect" that leads to an increase in reading error (also referred to herein as beta error) at the edge surfaces 316, 318, particularly as the feedback device 204 moves away from the sensor 212.

Figure 4:
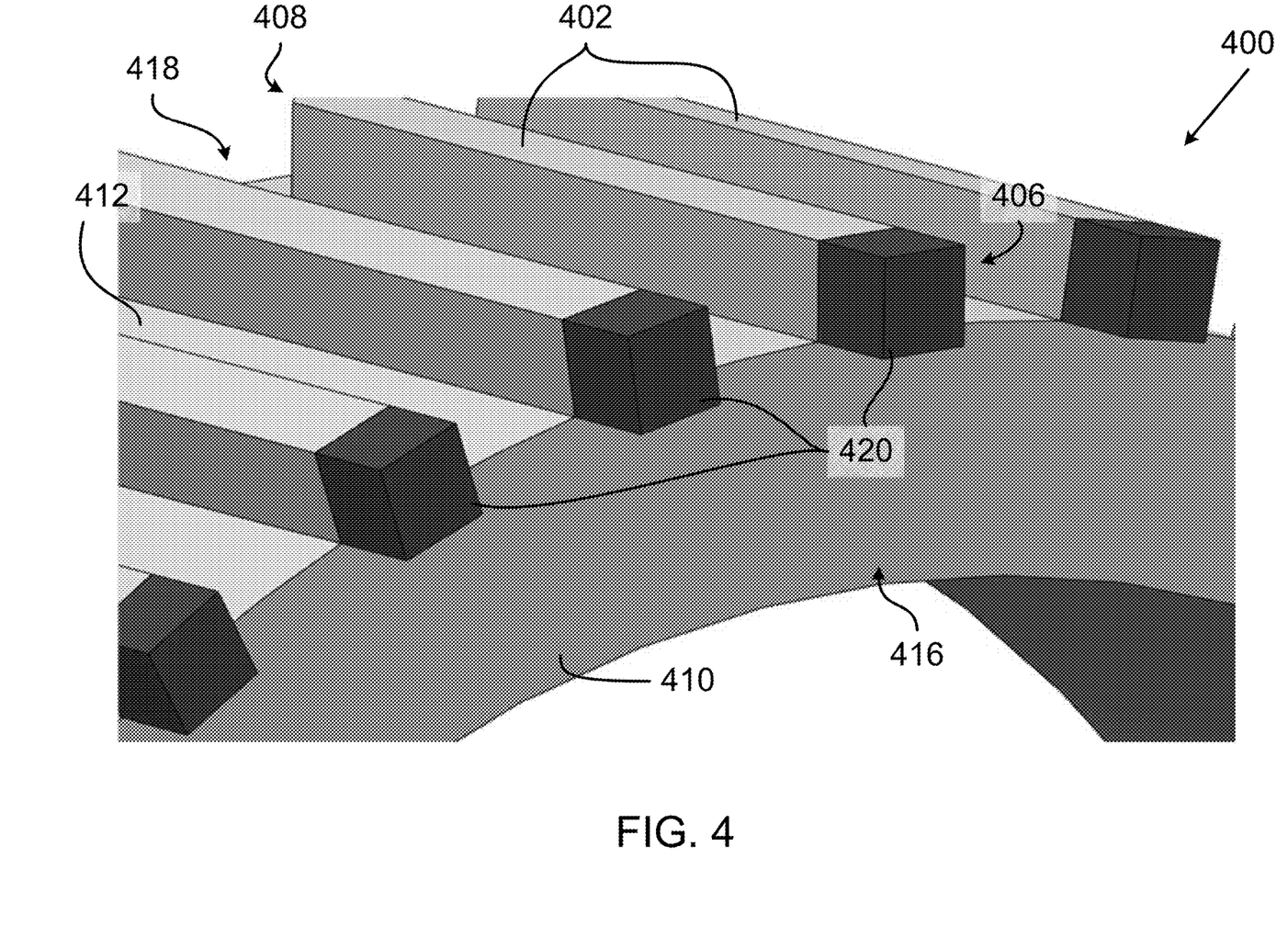
FIG. 4 is a perspective view of an example feedback devices.

With reference to FIG. 4, there is illustrated an embodiment of a feedback device 400 which can mitigate edge-effects. The feedback device 400 is composed of a circular disk 410 which defines a root surface 412 extending between opposing faces 416, 418. Extending axially from the root surface 412 are position markers 402, which are oriented substantially parallel to a longitudinal axis of the feedback device 400, which corresponds to axis 'A' of FIGS. 1 and 2. It should be noted, however, that in some embodiments, one or more of the position markers 402 can be oriented at some angle relative to the axis 'A'. The position markers 402 can be of any suitable length: in some cases, the position markers 402 extend beyond either or both of the faces 416, 418 of the circular disk 410; in other cases, the length of the position markers 402 is bounded by the faces 416, 418. For the purposes of illustration and explanation, the position markers 402 are described as extending between a first end portion 406 and a second end portion 408. The end portions 406, 408 can encompass any suitable proportion of the position markers 402. In one example, the end portions 406, 408 encompass those portions of the position markers 402 which extend beyond the faces 416, 418, respectively. In another example, the end portions 406, 408 encompass portions of the position markers 402 corresponding to a particular proportion of the position markers 402, for instance 10%, 20%, 50%, or any other suitable proportion. Other examples are considered.

In order to mitigate edge-effects, the end portions 406 and/or 408 of the position markers 402 are composed, at least in part, of a material having a higher magnetic permeability (hereinafter referred to as a "high-permeability material") than the material which composes the remainder of the position markers 402. In at least the embodiment of FIG. 4, the end portions 406 are provided with cap portions, denoted as 420, which are composed substantially entirely of the high-permeability material. The cap portions 420 can be affixed to the position markers 402 using any suitable techniques. For example, the cap portions 420 can be substantially wholly formed and then affixed to the position markers 402 via welding. In a further example, the high-permeability material can be applied to the end portions 406 of the position markers 402 via a coating technique, such as sputtering, electroplating, electroforming, or the like. It should be noted that the high-permeability material can be applied to the end portions 406, 408 of the position markers 402 regardless of whether the position markers 402 are arranged along a direction substantially transverse to the edge surfaces 416, 418, or whether they are arranged at some angle relative thereto.

In some embodiments, portions of the feedback device 400, including the circular disk 410 and at least part of the position markers 402, are made of a material such as steel, stainless steel, or the like, which have magnetic permeability in the range of $1.27 \times 10^{-6}$ H/m to $1.26 \times 10^{-4}$ H/m (henries per meter). In contrast, the cap portions 420 are made of the high-permeability material, for instance Mu-metal, which has a magnetic permeability in the rage of $2.5\text{-}6.3 \times 10^{-2}$ H/m. It should be understood that when the term "high-permeability material" is used herein, the meaning of "high-permeability" does not necessarily denote a particular value for magnetic permeability, nor a particular range of values. Rather, references to the high-permeability material are in contrast with the material which makes up the remainder of the position markers 402 and/or the circular disk 410, which includes at least some material of a lower magnetic permeability than the "high-permeability material" which makes up the cap portions 420, and which can be applied to the end portions 406, 408 in other fashions.

Because the cap portions 420 are formed of the high-permeability material, the cap portions 420 form an extension to the magnetic flux path for magnetic sensing, for instance as performed by the sensor 212. Put differently, the increased magnetic flux density provided by the presence of the cap portions 420 can help to mitigate edge-effects, for instance when the feedback device 400 is positioned so the sensor 212 is proximate the faces 416, 418.

With reference to FIGS. 5A-D, in some other embodiments, the end portions 406 and/or 408 can be provided with coatings formed of the high-permeability material which substantially cover part or all of the end portions 406 and/or 408. It should be noted that although the foregoing examples focus on embodiments in which the end portion 406 is provided with various coatings, embodiments in which the end portion 408 is alternatively, or additionally, provided with coatings are also considered. In addition, in some embodiments, the end portion 406 can be provided with one type of coating or cap portions, and the end portion 408 can be provided with a different type of coating or cap portions. It should also be noted that discussions of various embodiments involving coatings of the high-permeability material in the present disclosure are also applicable to embodiments in which the high-permeability material is formed in a sheet, plate, or the like, and is welded to one or more parts of the position markers 402, for instance the end portions 406, 408, using any suitable welding techniques. For instance, sheets of Mu-metal or similar ferromagnetic material can be welded to one or more parts of the position markers 402.

Figure 5A:
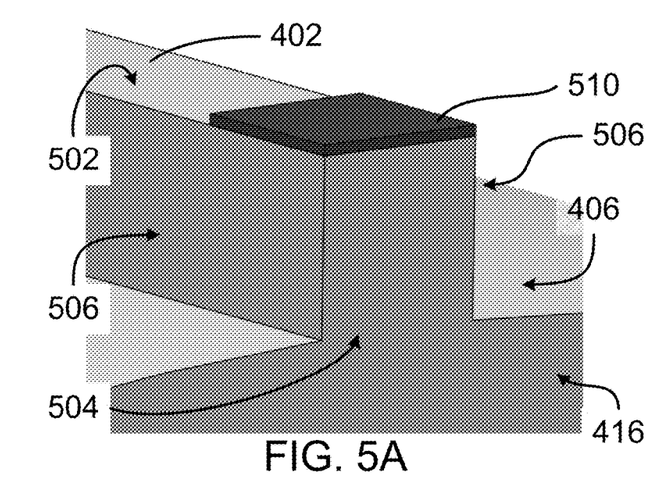
FIGS. 5A-D are perspective views of additional example feedback devices.

For example, as illustrated in FIG. 5A, the end portion 406 can be provided with a top coating 510 which is applied on a top surface 502 of the position markers 402. The top coating 510 is made of the high-permeability material, and can extend any suitable length along the top surface 502 of the position markers 402. In this example, only the top surface 502 is provided with the top coating 510, with a longitudinally-exterior face 504—which is parallel to the faces 416, 418 of the circular disk 410—and side surfaces 506 not being provided with any material coating. Alternatively, and although not explicitly illustrated here, in some embodiments the multi-sided coating 520 is extended to cover the longitudinally-exterior surface 504 surface of the position marker 402. In other embodiments, part or all of one or more of the surfaces 502, 504, 506 can be provided with a coating of the material.

Figure 5B:
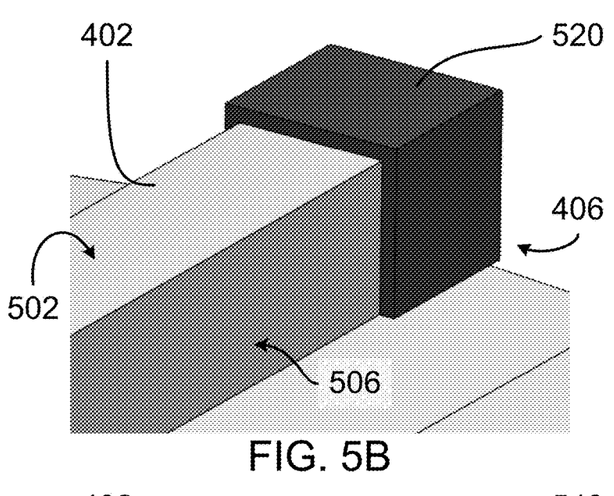

In another example, illustrated in FIG. 5B, the end portion 406 can be provided with a multi-sided coating 520 which can cover portions of multiple surfaces of the position markers 402. In this example, the multi-sided coating 520 covers both side surfaces 506 and the top surface 502 of the position markers 402. Additionally, although not explicitly illustrated here, in some embodiments the multi-sided coating 520 is extended to cover the longitudinally-exterior surface 504 surface of the position marker 402. Alternatively, the multi-sided coating can be restricted to the top and side surfaces 502, 506.

Figure 5C:
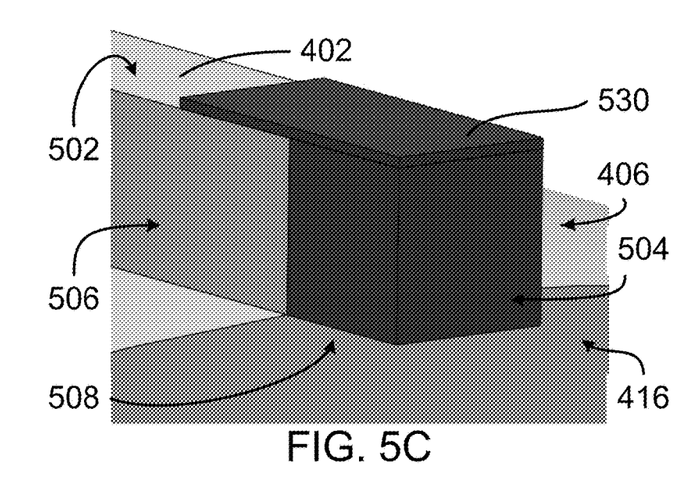

In a further example, illustrated in FIG. 5C, a multi-sided coating 530 is applied to the top, exterior, and side surfaces 502, 504, 506 of the position markers 402. The longitudinal length of the coating 530 on the top surface 502 may be greater than the longitudinal length for the coating 530 on the side surfaces 506 (depending on the particularities of the edge-effect experienced by different implementations of the feedback device 400, for instance the longitudinal location at which edge-effects first occur). In addition, in the example of FIG. 5C, the end portion 406 of the position markers 402 comprises an overhang portion which extends beyond the face 416: the coating 530 on the side surfaces 506 can extend from the extremity of the end portion 406 to the face 416, and the coating 530 on the top surface 502 can extend past the face 416. In some cases, the coating 530 can also extend to a bottom surface 508, for instance for the section of the end portion 406 which extends beyond the face 416.

Figure 5D:
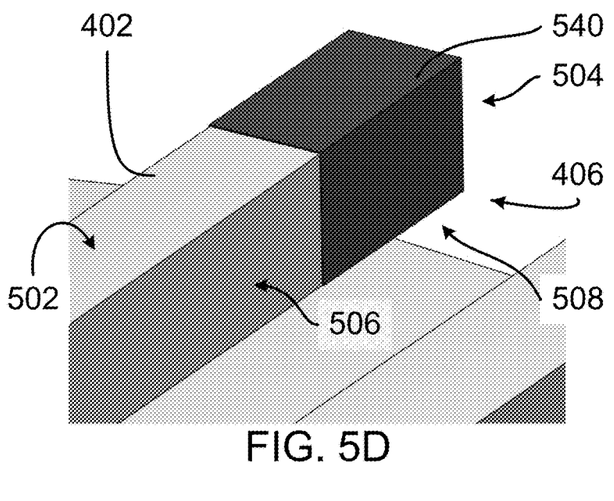

In a still further example, illustrated in FIG. 5D, a multi-sided coating 540 is applied to the top, exterior, and side surfaces 502, 504, 506 of the position markers 402. The coating 540 extends from the extremity of the end portion 406, including the overhang portion, and beyond the face 416. In some cases, the coating 530 can also extend to a bottom surface 508, for instance for the section of the end portion 406 which extends beyond the face 416.

Other configurations for caps, coatings, or the like, as applied to the end portions 406, 408 are also considered. For example, coatings can be applied to the end portions 406, 408 in accordance with various patterns. In another example, different high-permeability materials can be applied to different sections of the end portions 406, 408. For instance, the top surface 502 can be coated with a different material that the exterior or side surfaces 504, 506. In addition, in some cases the position markers 402 have straight edges, and in other cases the position markers 402 are provided with chamfered edges, and the high-permeability material can be applied to part or all of the chamfered edges.

As noted above, any one or more of the top coating 510, the multi-sided coating 520, the multi-sided coating 530, and the multi-sided coating 540 can be substituted for one or more plating or sheets, which are welded to the top surface 502, the exterior surface 504, the side surfaces 506, and/or the bottom surface 508, or to other portions of the position markers 402. The plating or sheets can be welded to the position markers 402 in any suitable fashion. It should also be noted that the longitudinal length of the coatings or platings applied to the position markers 402 may vary from one surface to the next: if edge-effects are more prominent for one side surface 506 of the position marker than for another, or for the top surface 502 versus any of the side surfaces 506, the coating or plating for one of the side surfaces 506 can extend a greater longitudinal length than for the other one of the side surfaces 506.

Figure 6:
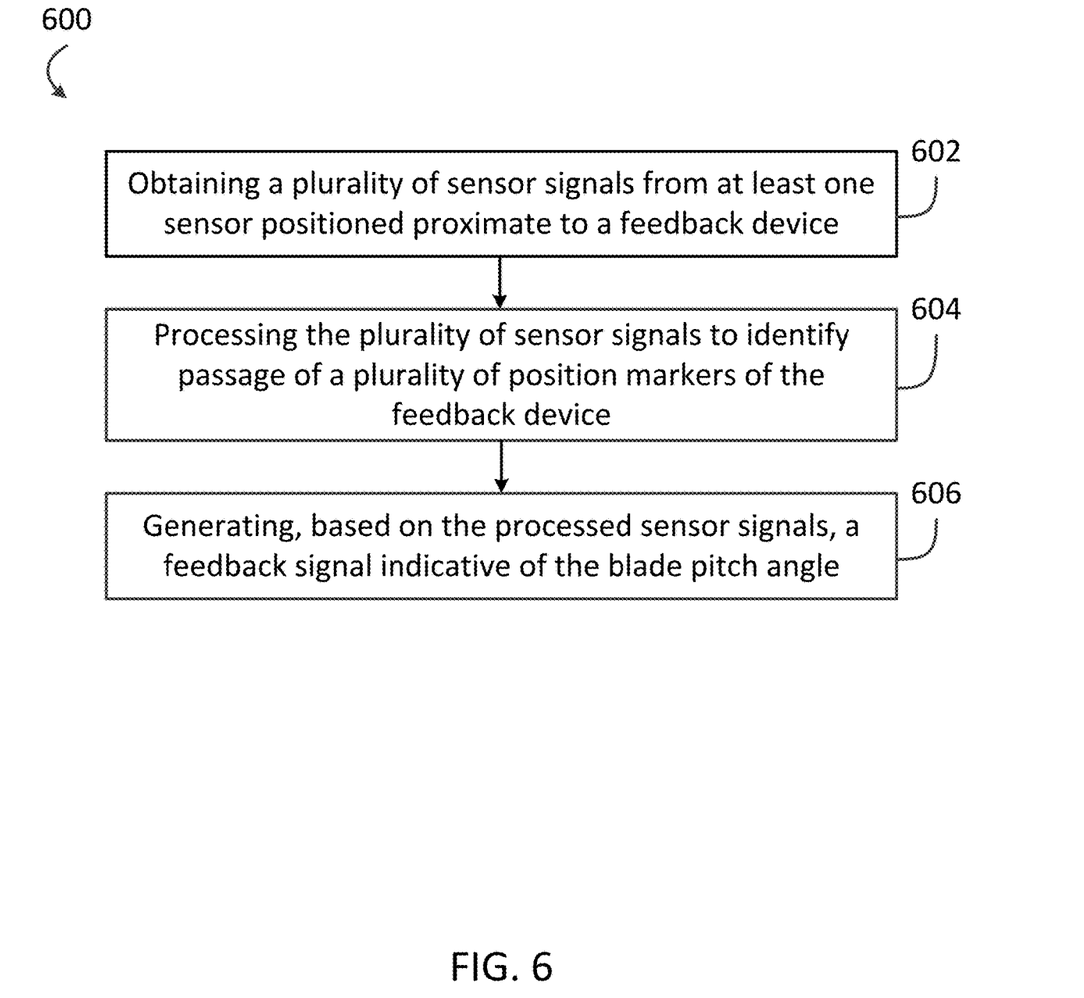
FIG. 6 is a flowchart illustrating an example method for controlling pitch for an aircraft-bladed rotor.

With reference to FIG. 6, there is illustrated a flowchart for a method 600 for controlling a pitch for an aircraft-bladed rotor, for instance the propeller 130. In some embodiments, the method 600 is performed by the detecting unit 222 and/or by the control unit 220. At step 602, a plurality of sensor signals are obtained from at least one sensor positioned proximate to a feedback device, for instance from the sensor 212 positioned proximate the feedback device 204. The feedback device 204 can be any suitable feedback device, for instance embodied as the feedback device 300 or the feedback device 350.

At step 604, the sensor signals are processed, for instance by the detecting unit 222 and/or by the control unit 220, to identify the passage of a plurality of position markers of the feedback device 204, for instance the position markers 202. The passage of the position markers 202 by the sensor 212 can be identified in a variety of fashions. In some embodiments, identification of the passage of the position markers 202 can be performed using a mark-space ratio (MSR) technique, which is described in United States Patent Application Publication No 2018/0050789 A1, which is incorporated herein by reference. For example, the MSR technique can be used to detect zero-crossings of the signals produced by the sensors 212.

At step 606, after the sensor signals are processed, a feedback signal indicative of blade pitch angle can be generated based on the processed sensor signals. The feedback signal can be any suitable type of signal, can encode information in any suitable fashion, and can be transmitted from the detecting unit 222 and/or the control unit 220 to any other suitable system, for instance an avionics system of an aircraft of which the engine 110 is a component. In some embodiments, the feedback signal can also be indicative of a rotational speed of a component with which the feedback device 204 rotates, for instance the propeller 130.

Figure 7:
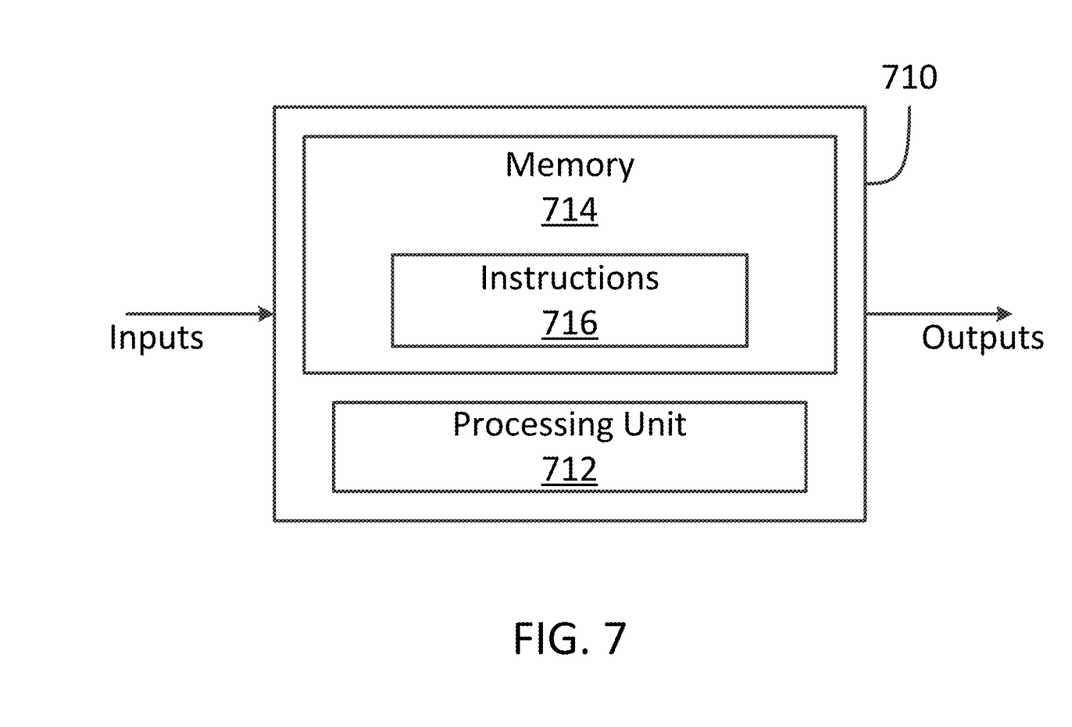
FIG. 7 is a block diagram of an example computing system for implementing the method of FIG. 6.

With reference to FIG. 7 the method 600 may be implemented using a computing device 710 comprising a processing unit 712 and a memory 714 which has stored therein computer-executable instructions 716. The processing unit 712 may comprise any suitable devices configured to implement the system such that instructions 716, when executed by the computing device 710 or other programmable apparatus, may cause the functions/acts/steps of the method 600 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. In some embodiments, the computing device 710 can be implemented as part of a full-authority digital engine controls (FADEC) or other similar device, including electronic engine control (EEC), engine control unit (ECU), and the like.

The methods and systems described herein may be implemented in a high level procedural or object oriented programming or scripting language, or a combination thereof, to communicate with or assist in the operation of a computer system, for example the computing device 710. Alternatively, the methods and systems may be implemented in assembly or machine language. The language may be a compiled or interpreted language. Program code for implementing the methods and systems for detection may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 712 of the computing device 710, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A feedback device for use in a gas turbine engine comprising a rotor rotatable about a longitudinal axis, the feedback device comprising:
   a circular disk having first and second opposing faces and defining a root surface that extends between and is circumscribed by the first and second faces; and
   a plurality of position markers extending radially from the root surface, circumferentially spaced around the circular disk, each position marker of the plurality of position markers extending longitudinally from a first end portion to a second end portion and, each position marker of the plurality of position markers comprising at least one of a first overhang portion at the first end portion and a second overhang portion at the second end portion, the first overhang portion extending longitudinally beyond the first face of the circular disk and the second overhang portion extending longitudinally beyond the second face of the circular disk, wherein, for each position marker of the plurality of position markers, at least part of the first end portion and/or of the second end portion comprises a first material having higher magnetic permeability than that of a second material composing a remainder of each position marker of the plurality of position markers.

2. The feedback device of claim 1, wherein the first material is applied as a coating on at least part of the first end portion and/or the second end portion.

3. The feedback device of claim 2, wherein the coating is applied on a top surface of the first end portion and/or of the second end portion.

4. The feedback device of claim 3, wherein the coating is applied on one or more side surfaces of the first end portion and/or the second end portion.

5. The feedback device of claim 3, wherein the coating is applied on a first exterior surface of the first end portion and/or a second exterior surface of the second end portion, wherein the first and second exterior surfaces are parallel to the first and second opposing faces of the circular disk.

6. The feedback device of claim 2, wherein a thickness of the coating varies along the longitudinal axis.

7. The feedback device of claim 1, wherein the first material is applied as a coating on a top surface, on one or more side surfaces, and/or on an exterior surface of the at least one of the first and second overhang portions, wherein the exterior surface is parallel to the first and second opposing faces of the circular disk.

8. The feedback device of claim 7, wherein the first material is applied as a coating on a bottom surface of the at least one of the first and second overhang portions, wherein the bottom surface is parallel with and opposite the top surface.

9. The feedback device of claim 7, wherein the coating is applied on the top surface of the at least one of the first and second overhang portions and extends to a top portion of the first end portion and/or the second end portion disposed between the first and second faces of the circular disk.

10. The feedback device of claim 9, wherein the coating is further applied on the one or more side surfaces of the at least one of the first and second overhang portions and extends to one or more side surfaces of the first end portion and/or the second end portion disposed between the first and second faces of the circular disk.

11. The feedback device of claim 1, wherein the at least one of the first and second overhang portions is composed of the first material having higher permeability than the remainder of the position markers.

12. The feedback device of claim 1, wherein the plurality of position markers define a discontinuity between two adjacent ones of the plurality of position markers detectable by at least one sensor.

13. A method for controlling a pitch for an aircraft-bladed rotor, comprising:
   obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers spaced circumferentially around the feedback device and extending radially from a root surface of a circular disk composing the feedback device, the root surface extending between and circumscribing first and second opposing faces of the circular disk, each position marker of the plurality of position markers extending longitudinally from a first end portion to a second end portion, each position marker of the plurality of position markers comprising at least one of a first overhang portion at the first end portion and a second overhang portion at the second end portion, the first overhang portion extending longitudinally beyond the first face of the circular disk and the second overhang portion extending longitudinally beyond the second face of the circular disk, wherein, for each position marker of the plurality of position markers, at least part of the first end portion and/or of the second end portion comprises a first material having higher permeability than that of a second material composing a remainder of each position marker of the plurality of position markers;

processing the plurality of sensor signals to identify passage of the plurality of position markers of the feedback device; and generating, based on the processed sensor signals, a feedback signal indicative of the blade pitch angle.

14. The method of claim 13, further comprising identifying, based on the processing of the plurality of sensor signals, the at least one of the first and second overhang portions.

15. The method of claim 13, wherein processing the plurality of sensor signals comprises detecting a discontinuity between two adjacent ones of the plurality of position markers.

16. The method of claim 13, wherein processing the plurality of sensor signals to identify passage of the plurality of position markers comprises determining a mark-space ratio based on the plurality of sensor signals.

17. The method of claim 13, wherein the feedback signal is further indicative of a rotational speed of the aircraft-bladed rotor.

18. A system for controlling a pitch for an aircraft-bladed rotor, comprising:

a processing unit; and a non-transitory computer-readable memory communicatively coupled to the processing unit and comprising computer-readable program instructions executable by the processing unit for:

obtaining a plurality of sensor signals from at least one sensor positioned proximate to a feedback device, the feedback device coupled to rotate with the rotor about a longitudinal axis and to move along the longitudinal axis with adjustment of a blade pitch angle of the rotor, the sensor signals produced by the at least one sensor in response to detecting passage of a plurality of position markers of the feedback device as the feedback device rotates about the longitudinal axis, the plurality of position markers spaced circumferentially around the feedback device and extending radially from a root surface of a circular disk composing the feedback device, the root surface extending between and circumscribing first and second opposing faces of the circular disk, each position marker of the plurality of position markers extending longitudinally from a first end portion to a second end portion, each position marker of the plurality of position markers comprising at least one of a first overhang portion at the first end portion and a second overhang portion at the second end portion the first overhang portion extending longitudinally beyond the first face of the circular disk and the second overhang portion extending longitudinally beyond the second face of the circular disk, wherein, for each position marker of the plurality of position markers, at least part of the first end portion and/or of the second end portion comprises a first material having higher magnetic permeability than that of a second material comprising a remainder of each position marker of the plurality of position markers;

processing the plurality of sensor signals to identify passage of the plurality of position markers of the feedback device; and generating, based on the processed sensor signals, a feedback signal indicative of the blade pitch angle.

19. The feedback device of claim 1, wherein a cap made of the first material is affixed to the first end portion or to the second end portion, or two caps made of the first material are affixed to the first and second end portions respectively.

* * * * *